United States Patent [19]

Schreurs

[11] 3,987,331
[45] Oct. 19, 1976

[54] ULTRAVIOLET EMITTING FLUORESCENT LAMP HAVING INTERNAL REFLECTOR FILM

[75] Inventor: Willy P. Schreurs, Danvers, Mass.

[73] Assignee: GTE Sylvania Incorporated, Danvers, Mass.

[22] Filed: Mar. 24, 1975

[21] Appl. No.: 561,407

[52] U.S. Cl. .............................. 313/486; 313/113; 313/488; 313/493
[51] Int. Cl.² .................... H01J 61/35; H01J 61/44
[58] Field of Search ............ 313/488, 486, 113, 493

[56] References Cited
UNITED STATES PATENTS

| | | |
|---|---|---|
| 2,445,692 | 7/1948 | Porter et al. .......................... 313/486 |
| 2,854,600 | 9/1958 | van de Weijer et al. ............ 313/488 |
| 3,043,781 | 7/1962 | Mooney et al. ............... 252/301.4 F |
| 3,295,003 | 12/1966 | Chernin .............................. 313/488 |
| 3,651,363 | 3/1972 | Barry .................................. 313/486 |

Primary Examiner—Palmer C. Demeo
Attorney, Agent, or Firm—James Theodosopoulos

[57] ABSTRACT

An ultraviolet emitting fluorescent lamp contains an internal reflector film to increase the forward flux of the lamp. The reflector film comprises a layer of zirconia on the inside glass wall of the lamp envelope.

3 Claims, 3 Drawing Figures

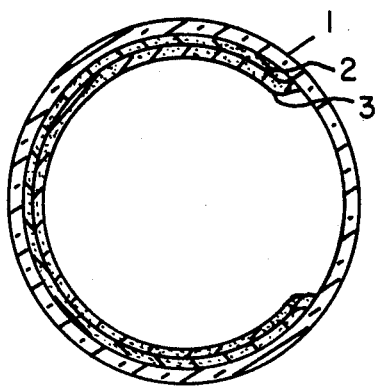
FIG.1
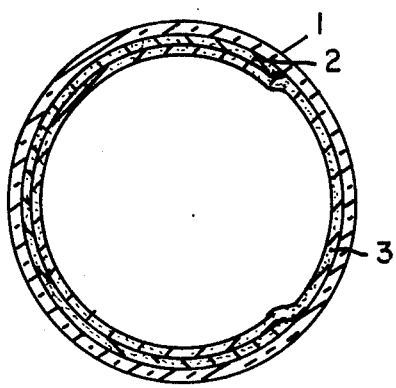
FIG.2
FIG.3
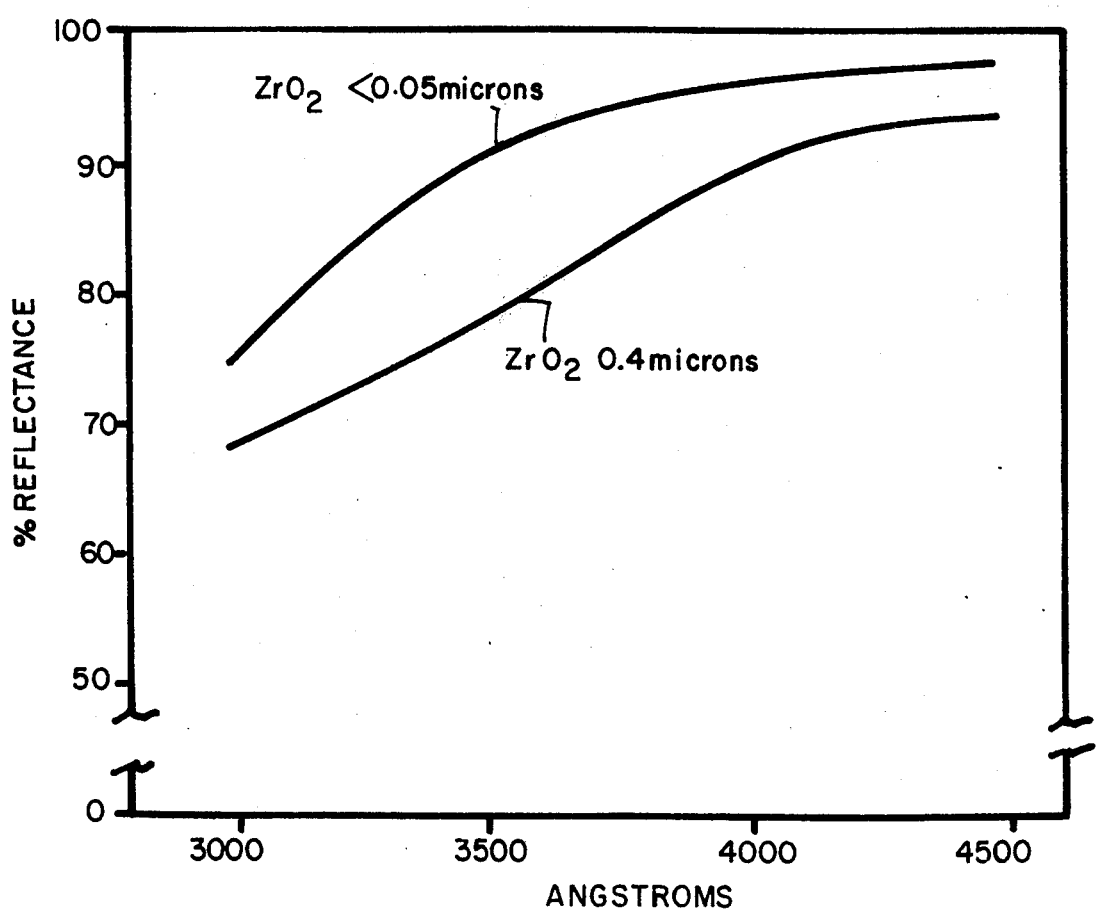

ULTRAVIOLET EMITTING FLUORESCENT LAMP HAVING INTERNAL REFLECTOR FILM

BACKGROUND OF THE INVENTION

1. Field of the Invention

This invention relates to fluorescent lamps which emit radiation in the ultraviolet range of the electromagnetic spectrum. Such lamps comprise a long tubular glass envelope having an ultraviolet emitting phosphor on the inner wall thereof and having electrodes at each end of the envelope with a low pressure mercury arc discharge therebetween during lamp operation. The invention particularly concerns such lamps having a reflective film on the inner envelope wall.

Such lamps, having a phosphor that emits in the long ultraviolet or about 3200 to 4000 angstroms, have recently become useful in the treatment of psoriasis.

2. Description of the Prior Art

Fluorescent lamps having an internal reflective layer for the purpose of enhancing the forward brightness of visible light have been known for some time. Such lamps are disclosed in U.S. Pat. Nos. 2,854,600 and 3,295,003. In another version, the lamps include a longitudinal uncoated portion, a so-called aperture, facing the reflective layer as in U.S. Pat. No. 3,225,241.

Disclosed as suitable reflectors for visible light are materials having a high refractive index. A preferred visible light reflector is made of titania having a particle size about half that of the median wavelength of the visible spectrum, about 0.3 micron, although zirconia is an alternative reflective material. Other disclosed reflector materials are zinc oxide, white lead, antimony oxide, zinc sulfide, alumina and magnesia.

The three patents are particularly concerned with visible light emitting phosphors and with reflector materials suitable for reflecting visible light, although it is disclosed that alumina and magnesia can be used to reflect ultraviolet radiation. The patents state that ultraviolet reflection can be useful if the phosphor coating is too thin to absorb all the 2537 angstrom radiation from the mercury arc; then the ultraviolet reflector can reflect such 2537 radiation back with the result that the total amount of 2537 radiation that is converted to visible radiation by the phosphor is increased.

The patents disclose that magnesia is unsatisfactory as a 2537 angstrom reflecting material, because it causes heavy lamp blackening, and that titania is also a poor reflector of such radiation, the rutile form thereof reflecting only about 7%.

It is an object of this invention to provide a fluorescent lamp having an internal reflector that is efficient in reflecting radiation other than the visible radiation or 2537 radiation disclosed in the prior art.

SUMMARY OF THE INVENTION

A fluorescent lamp in accordance with this invention comprises a tubular glass envelope having a reflector film on a portion of the inner glass wall, the film being an efficient reflector of long-ultraviolet radiation. The lamp also contains a long-ultraviolet emitting phosphor, that is, a phosphor that is efficient in converting the 2537 radiation from the low pressure mercury arc into long-ultraviolet radiation, that is radiation between about 3200 to 4000 angstroms.

The reflector film covers more than 180° of the lamp circumference, the desired long-ultraviolet radiation (the so-called forward flux) being emitted through the portion of the envelope wall that does not have the reflector film, the so-called window. An optimum reflector material is zirconium dioxide having an average particle size less than 0.05 microns.

BRIEF DESCRIPTION OF THE DRAWING

FIG. 1 is a cross-sectional view of a lamp having a reflector film, a phosphor thereover and an uncoated window. In FIG. 2, the phosphor covers both the reflector film and the window.

FIG. 3 shows the reflectance of two different particle sizes of zirconium dioxide.

DESCRIPTION OF THE PREFERRED EMBODIMENT 600 grams of $ZrO_2$ having an average particle size of 0.036 microns are dispersed in 1000 ml nitrocellulose vehicle and 25 ml tricresyl phosphate as plasticizer by ball milling for 8 hours. The resulting dispersion is adjusted for viscosity either with nitrocellulose lacquer, or its solvent, butyl acetate, in order to suit the particular drying conditions, and coated by conventional method on the inner wall of a fluorescent lamp bulb. The nitrocellulose vehicle is a 2% solution of 1000 second nitrocellulose in butyl acetate while the nitrocellulose lacquer is a 5% solution of 1000 second nitrocellulose in butyl acetate.

Such conventional coating method may include a down flush coating followed by a down draft drying and a scraping of part of the coating. Or the coating may be achieved in a horizontal position in which case a limited volume of suspension is flowed into the bulb and the latter is rotated in order to coat the desired part of the periphery of the bulb. The excess suspension is then poured out of the bulb and the drying is achieved with the bulb in a near vertical position to avoid marring the clear portion.

After drying, the bulb is coated with a long-ultraviolet emitting phosphor suspension in an ethyl cellulose xylol vehicle or in a water-base vehicle, dried, lehred at 650° C for approximately 3 minutes and processed into a completed lamp in conventional manner. An example of an ethyl cellulose-xylol vehicle is 2.9 grams of 2000 second ethyl cellulose, 4.4 grams of dibutyl phthalate, 91.4 grams of xylol and 1.3 grams of butanol.

As shown in FIG. 1, phosphor coating 3 may be limited to about the same area as reflector film 2 or, as shown in FIG. 2, phosphor coating 3 can be applied over the whole periphery of glass envelope 1. The former is known as an aperture lamp since the window contains no phosphor coating. In the latter the window is covered by phosphor.

Reflective films of $ZrO_2$ in accordance with this invention are as effective in reflecting long-ultraviolet radiations as films of $TiO_2$ are for visible light. This is due in part to the low ultraviolet absorption of the zirconia and also to the compactness of the film resulting from the use of very small particle size $ZrO_2$. The prior art discloses an optimum titania particle size of 0.3 microns for the visible light reflective layer but I have found that superior results in reflecting long-ultraviolet are obtained with zirconia particles that are about one order of magnitude smaller.

FIG. 3 shows a comparison of the reflectance of 0.4 micron zirconia with zirconia having an average particle size less than 0.05 microns over the range of 3000 to 4500 angstroms. It can be seen that, in the long-ultraviolet range, the smaller particle size zirconia is markedly superior in reflectance. At 3600 angstroms, about the center of the long-ultraviolet range, the smaller particle size zirconia has about 16% better reflectance.

In one example, a 48 inch, 40 watt fluorescent lamp in accordance with this invention had a reflective film 2 of 0.036 micron zirconia covering 235° of the periphery of envelope 1 and a phosphor coating 3 of lead activated barium mesosilicate covering the entire periphery of envelope 1. The peak emission of this phosphor is at 3510 angstroms and it has a band width of 410 angstroms. The forward intensity of the lamp was approximately 175% of that of a nonreflector lamp while the back intensity was only approximately 12%.

The loading of the reflective film was 3.5 mg $ZrO_2$ per square centimeter and the film thickness was approximately 7.5 microns. The degree of compactness of a particulate film can be determined by the ratio of actual film thickness to the theoretical thickness.

The theoretical thickness is that of a solid film without voids; voids result from the presence of an organic binder which is removed by the lehring operation. The theoretical thickness is obtained from the ratio of the film loading over the specific gravity of the material.

For example, $ZrO_2$ has a specific gravity of 5.6. In the above example, where the film loading is 3.5 mg per square centimeter, the theoretical thickness is 3.5/5.6 which equals $0.625 \times 10^{-3}$ cm or 6.25 microns. The compactness of the film is 7.5 microns divided by 6.25 microns which equals 1.2. This is considerably more compact — almost double — than the compactness of the prior art titania films used in reflecting visible light. The compactness of the rutile $TiO_2$ film in U.S. Pat. No. 2,854,600, which has a grain size of about 0.3 microns, a layer thickness of about 10 microns, a loading of about 2 mg per square centimeter and where the rutile $TiO_2$ has a specific gravity of 4.26, is 2.13.

I claim:

1. A fluorescent arc discharge lamp comprising a tubular glass envelope, a reflector film on a major portion of the internal wall of the envelope, the reflector film being an efficient reflector of long-ultraviolet radiation, a long-ultraviolet emitting phosphor coating on the reflector film, and means in the envelope for generating 2537 angstrom radiation, wherein the reflector film comprises zirconium dioxide and wherein the zirconium dioxide has a particle size less than about 0.05 microns.

2. The lamp of claim 1 wherein the compactness of the reflector film is about 1.2.

3. The lamp of claim 1 wherein the phosphor is lead activated barium mesosilicate.

* * * * *